United States Patent
Owen et al.

(10) Patent No.: US 11,336,748 B2
(45) Date of Patent: **\*May 17, 2022**

(54) SYSTEM AND METHOD FOR DEPLOYING RESOURCES WITHIN A COMPUTING INFRASTRUCTURE

(71) Applicant: ServiceNow, Inc., Santa Clara, CA (US)

(72) Inventors: James Owen, Cupertino, CA (US); Danny Kibel, Saratoga, CA (US); Christian Ewart Francis Challenger-Lee, Sunnyvale, CA (US); Chanwook Kim, San Jose, CA (US)

(73) Assignee: ServiceNow, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/074,275

(22) Filed: Oct. 19, 2020

(65) Prior Publication Data

US 2021/0037115 A1 Feb. 4, 2021

Related U.S. Application Data

(63) Continuation of application No. 16/356,127, filed on Mar. 18, 2019, now Pat. No. 10,812,625, which is a continuation of application No. 15/593,634, filed on May 12, 2017, now Pat. No. 10,270,885.

(60) Provisional application No. 62/335,997, filed on May 13, 2016.

(51) Int. Cl.
*H04L 29/08* (2006.01)
*G06F 8/60* (2018.01)
*H04L 67/00* (2022.01)

(52) U.S. Cl.
CPC ............... *H04L 67/34* (2013.01); *G06F 8/60* (2013.01)

(58) Field of Classification Search
USPC .................................................. 717/121, 177
See application file for complete search history.

(56) References Cited

U.S. PATENT DOCUMENTS

| | | |
|---|---|---|
| 5,978,594 A | 11/1999 | Bonnell |
| 6,321,229 B1 | 11/2001 | Goldman |
| 6,554,750 B2 | 4/2003 | Stearns |
| 6,609,122 B1 | 8/2003 | Ensor |

(Continued)

*Primary Examiner* — John Q Chavis
(74) *Attorney, Agent, or Firm* — Fletcher Yoder, P.C.

(57) ABSTRACT

Systems and techniques for deploying resources within a computing infrastructure are herein disclosed as comprising, in an implementation, executing a first deployment agent to perform a first deployment action, the first deployment agent configured to deploy a first resource to a first device; changing a deployment state of the first deployment agent responsive to performing the first deployment action; and executing a second deployment agent to perform a second deployment action, the second deployment agent configured to deploy a second resource to a second device. The second deployment agent performs the second deployment action in response to a change in a deployment state of an arbitrary deployment agent not explicitly identified within the second deployment agent. A deployment plan configured to cause the execution of the first and second deployment agents includes an identification of the first deployment agent as the arbitrary deployment agent.

20 Claims, 6 Drawing Sheets

(56) References Cited

U.S. PATENT DOCUMENTS

| | | |
|---|---|---|
| 6,816,898 B1 | 11/2004 | Scarpelli |
| 6,895,586 B1 | 5/2005 | Brasher |
| 7,020,706 B2 | 3/2006 | Cates |
| 7,027,411 B1 | 4/2006 | Pulsipher |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,392,300 B2 | 6/2008 | Anantharangachar |
| 7,617,073 B2 | 11/2009 | Trinon |
| 7,630,877 B2 | 12/2009 | Brown et al. |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,877,783 B1 | 1/2011 | Cline |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 8,997,078 B2 | 3/2015 | Spivak et al. |
| 9,098,322 B2 | 8/2015 | Apte |
| 9,239,857 B2 | 1/2016 | Trinon |
| 9,317,327 B2 | 4/2016 | Apte |
| 9,363,252 B2 | 6/2016 | Meuller |
| 9,535,737 B2 | 1/2017 | Joy |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,805,322 B2 | 10/2017 | Kelkar |
| 10,031,783 B2 | 7/2018 | Jalagam et al. |
| 10,270,885 B2 * | 4/2019 | Owen ................ H04L 67/34 |
| 10,812,625 B2 * | 10/2020 | Owen ................ G06F 8/60 |
| 2012/0072480 A1 | 3/2012 | Hays et al. |
| 2012/0266158 A1 | 10/2012 | Spivak et al. |
| 2013/0185715 A1 | 7/2013 | Dunning et al. |
| 2013/0232463 A1 * | 9/2013 | Nagaraja ............ G06F 8/61 717/101 |
| 2013/0232497 A1 | 9/2013 | Jalagam et al. |
| 2013/0232498 A1 | 9/2013 | Mangtani et al. |
| 2015/0074278 A1 | 3/2015 | Maes et al. |
| 2015/0256392 A1 | 9/2015 | Mazhar et al. |
| 2015/0350101 A1 | 12/2015 | Sinha et al. |
| 2016/0019096 A1 | 1/2016 | Winterfeldt et al. |
| 2017/0134301 A1 | 5/2017 | Chen et al. |
| 2017/0286083 A1 | 10/2017 | Dimitrakos et al. |
| 2017/0329592 A1 | 11/2017 | Hoff et al. |
| 2018/0032377 A1 | 2/2018 | Nelson et al. |
| 2018/0041593 A1 | 2/2018 | Macinnis |

* cited by examiner

SYSTEM AND METHOD FOR DEPLOYING RESOURCES WITHIN A COMPUTING INFRASTRUCTURE

CROSS-REFERENCE TO RELATED APPLICATION(S)

This application is a continuation of U.S. patent application Ser. No. 16/356,127, filed Mar. 18, 2019, entitled, "SYSTEM AND METHOD FOR DEPLOYING RESOURCES WITHIN A COMPUTING INFRASTRUCTURE"; which is a continuation of U.S. application Ser. No. 15/593,634, filed May 12, 2017, entitled, "SYSTEM AND METHOD FOR DEPLOYING RESOURCES WITHIN A COMPUTING INFRASTRUCTURE", and which issued as U.S. Pat. No. 10,270,885; which claims the benefit of U.S. Provisional Application No. 62/335,997, filed May 13, 2016, the disclosures of which are incorporated by reference herein in their entirety for all purposes.

TECHNICAL FIELD

The present disclosure relates in general to deploying resources within a computing infrastructure.

BACKGROUND

Computer networks can be used for exchanging and storing data. The service environments of a computer network can change, for example, based on institutional needs. Administration of a computing infrastructure can include configuring new devices and software for use within the computer network. In certain situations, configuring the devices and software can include deploying the software to network-connected devices for use in delivering services through the computing infrastructure.

SUMMARY

Disclosed herein are implementations of systems and techniques for deploying resources within a computing infrastructure.

In an implementation, a system is provided for deploying resources within a computing infrastructure using loosely coupled deployment agents. The system comprises a memory and a processor. The memory includes instructions executable by the processor to execute, based on a deployment plan, a first deployment agent to perform a first deployment action, wherein the first deployment agent is configured to deploy a first resource to a first device of the computing infrastructure. The memory further includes instructions executable by the processor to change a deployment state of the first deployment agent responsive to the performance of the first deployment action. The memory further includes instructions executable by the processor to execute, based on the deployment plan, a second deployment agent to perform a second deployment action responsive to a change in a deployment state of an arbitrary deployment agent not explicitly identified within the second deployment agent, wherein the second deployment agent is configured to deploy a second resource to a second device of the computing infrastructure. The deployment plan includes an identification of the first deployment agent as the arbitrary deployment agent.

In an implementation, a method is provided for deploying resources within a computing infrastructure using loosely coupled deployment agents. The method comprises executing, based on a deployment plan, a first deployment agent to perform a first deployment action, wherein the first deployment agent is configured to deploy a first resource to a first device of the computing infrastructure. The method further comprises changing a deployment state of the first deployment agent responsive to performing the first deployment action. The method further comprises executing, based on the deployment plan, a second deployment agent to perform a second deployment action responsive to a change in a deployment state of an arbitrary deployment agent not explicitly identified within the second deployment agent, wherein the second deployment agent is configured to deploy a second resource to a second device of the computing infrastructure. The deployment plan includes an identification of the first deployment agent as the arbitrary deployment agent.

In an implementation, a non-transitory computer-readable storage medium is provided comprising processor-executable routines that, when executed by a processor, facilitate a performance of operations. The operations comprise performing a first deployment action using a first deployment agent configured to deploy a first resource to a first device. The operations further comprise changing a deployment state of the first deployment agent responsive to performing the first deployment action. The operations further comprise performing a second deployment action using a second deployment agent responsive to a change in a deployment state of an arbitrary deployment agent not explicitly identified within a second deployment agent. The second deployment agent is configured to deploy a second resource to a second device. The first deployment agent is identified as the arbitrary deployment agent.

These and other implementations of the present disclosure are disclosed in the following detailed description, the appended claims, and the accompanying figures.

BRIEF DESCRIPTION OF THE DRAWINGS

The description herein makes reference to the accompanying drawings, wherein like reference numerals refer to like parts throughout the several views.

DETAILED DESCRIPTION

Figure 1:
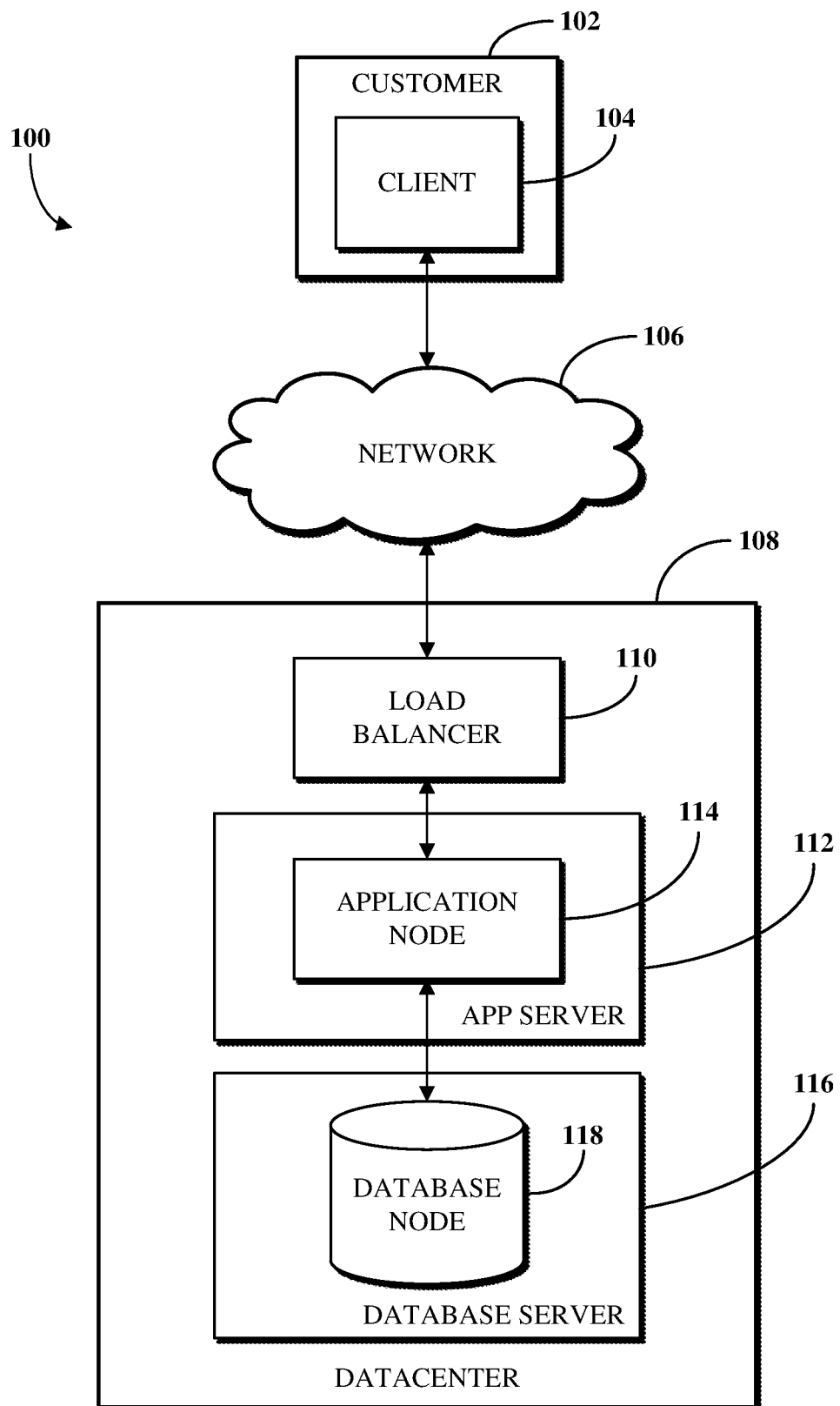
FIG. 1 is a block diagram of an example of an electronic computing and communications system.

Generally, deployment can refer to the provisioning of a resource, such as a device or software executed on a device, in a computing infrastructure connected by a computer network. The deployment of a resource can be governed by, for example, the structure of the computer network, including information indicating how the resource will be used within it. A deployment agent can be used to deploy a resource to a device connected by a computer network within a computing infrastructure. A deployment agent may include various steps, or deployment actions, for preparing the resource for use in a runtime environment of within the computing infrastructure. The deployment agent can also include a state indicative of a current deployment status of the corresponding resource.

Multiple deployment agents can be used together (e.g., wherein the deployment of their respective resources can occur simultaneously or proximate to one another) for provisioning related resources. In some cases, deployment agents can be used together based on the characteristics of their corresponding resources. For example, where a Nginx load balancer communicates with a Tomcat application server, the deployment agent used for provisioning the Tomcat can be dependent upon the deployment agent used for provisioning the Nginx. A deployment plan can be prepared for indicating the relationship between deployment agents used to provision related resources. However, the preparation of a deployment plan typically requires that each deployment agent have information indicating its relationship to specific, other deployment agents.

Further, the deployment actions of a given deployment agent can be sequentially performed, independent of other deployer agents. That is, the deployment actions of a second deployment agent that depends from a first deployment agent would not begin performing until after the performance of the deployment actions of the first deployment agent has been completed. To the extent one deployment action of a given deployment agent could be performed independent of its other steps (e.g., not as part of a sequence), the performance of that one deployment action can be hardcoded, making it difficult to configure. Typical deployment plans are thus problematic because deployment agents may not be agnostic with respect to one another. For example, a deployment plan using the above resources may have a rule that precludes the Nginx from starting until after the Tomcat starts. Additionally, because the deployment agents used to deploy resources within a computing infrastructure may change over time (e.g., where the resources of the computer network have changed), the defining of connections between specific deployment agents as part of a deployment plan can cause significant errors, for example, by improperly deploying, or entirely failing to deploy, resources for use in a runtime environment.

Implementations of the present disclosure describe systems and techniques for deploying resources to devices connected by a computer network within a computing infrastructure using loosely coupled deployment agents. The performance of individual deployment actions by a given deployment agent can be configured based on a state of an arbitrary deployment agent. For example, the arbitrary deployment agent can be a second deployment agent included in a deployment plan with a first deployment agent that performs a given deployment action. For example, a deployment action can be performed by a first deployment agent based on a change in a state of the arbitrary deployment agent. In this way, a deployment plan can be prepared for deploying related resources within a computing infrastructure without specifying the connections between deployment agents.

As used herein, resources can refer to infrastructure resources (e.g., hardware components, such as switches, routers, servers, modems, processors, I/O interfaces, memory or storage, power supplies, biometric readers, media readers, etc.) and/or applicative resources (e.g., software components, such as platform applications, modules, routines, firmware processes, and other instructions executable by or in connection with infrastructure resources). Resources can also refer to computing features such as documents, models, plans, sockets, virtual machines, etc. Resources can refer to physical and/or virtual implementations of the foregoing, as applicable. The present disclosure may occasionally make specific reference, for example, to infrastructure resources or applicative resources for certain uses of resources; however, where the disclosure merely references "resources" or "network resources," it may refer to any of the foregoing types of resources, unless the context specifically indicates otherwise. Unless explicitly stated otherwise, the terms "resource" and "network resource" may be used interchangeably throughout this disclosure.

To describe some implementations in greater detail, reference is first made to examples of hardware structures. FIG. 1 is a block diagram of an example of an electronic computing and communications system 100. As used herein, the term "electronic computing and communications system," or variations thereof, can be, or include, a distributed computing system (e.g., a client-server computing system), a cloud computing system, a clustered computing system, or the like.

The system 100 can include one or more customers 102, which may be a public entity, private entity, or other corporate entity or individual that purchases or otherwise uses services of a software provider, such as a PaaS service provider. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or any other suitable computing device or combination of computing devices. In some implementations, the client 104 can be implemented as a single physical unit or as a combination of physical units. In some implementations, a single physical unit can include multiple clients.

The client 104 can be an instance of software running on a customer device associated with the customer 102. As used herein, the term "software" can include, but is not limited to, applications, programs, instances, processes, threads, services, plugins, patches, application version upgrades, or any other identifiable computing aspect capable of accessing or interacting with, directly or indirectly, a database. The system 100 can include any number of customers or clients or can have a configuration of customers or clients different from that generally illustrated in FIG. 1. For example, and without limitation, the system 100 can include hundreds or thousands of customers, and at least some of the customers can include or be associated with any number of clients. A customer can include a customer network or domain. For example, and without limitation, the client 104 can be associated or communicate with a customer network or domain.

The system 100 can include a datacenter 108. The datacenter 108 can include one or more servers. For example, and without limitation, the datacenter 108, as generally illustrated, includes an application server 112 and a database server 116. A datacenter, such as the datacenter 108, can represent a geographic location, which can include a facility, where the one or more servers are located. The system 100 can include any number of datacenters and servers or can include a configuration of datacenters and servers different from that generally illustrated in FIG. 1. For example, and without limitation, the system 100 can include tens of datacenters, and at least some of the datacenters can include hundreds or any suitable number of servers. In some implementations, the datacenter 108 can be associated or communicate with one or more datacenter networks or domains, which can include domains other than the client domain.

The client 104 and the servers associated with the datacenter 108 may be configured to connect to, or communicate via, a network 106. Furthermore, a client 104 associated with the customer 102 can connect to the network 106 via a communal connection point, link, or path, or using a distinct connection point, link, or path. A connection point, link, or path can be wired, wireless, use other communications technologies, or a combination thereof.

The network 106 can include, for example, the Internet, and/or the network 106 can be, or include, a local area network (LAN), a wide area network (WAN), a virtual private network (VPN), or any other public or private means of electronic computer communication capable of transferring data between a client, such as the client 104, and one or more servers associated with the datacenter 108, or a combination thereof. The network 106, the datacenter 108, or any other element, or combination of elements, of the system 100 can include network hardware such as routers, switches, load balancers, other network devices, or combinations thereof. For example, the datacenter 108 can include a load balancer 110 for routing traffic from the network 106 to various servers associated with the datacenter 108.

The load balancer 110 can route, or direct, computing communications traffic, such as signals or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or software provided by the datacenter 108.

Maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

The datacenter 108 may include an application server 112 and a database server 116. The application server 112 or the database server 116 can be a computing system, which can include one or more computing devices, such as a desktop computer, a server computer, or any other computer capable of operating as a server. In some implementations, the application server 112 or the database server 116 can be non-hardware servers implemented on a physical device, such as a hardware server. In some implementations, the application server 112 and the database server 116 can be implemented as a single hardware server or as a single non-hardware server implemented on a single hardware server. Of course, any number of application servers or database servers can be implemented at the datacenter 108, and the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve data from a database, such as a database node 118 executing on the database server 116.

The application server 112 can include any suitable number of application nodes, depending upon a system load or other characteristics associated with the application server 112. For example, and without limitation, the application server 112 can include two or more nodes forming a node cluster. In some implementations, the application nodes implemented on a single application server 112 can run on different hardware servers.

The database server 116 can be configured to store, manage, or otherwise provide data for delivering services to the client 104 over a network. The database server 116 may include a data storage unit, such as the database node 118, which can be accessible by software executed on the application node 114. A database implemented by the database node 118 may be a relational database management system (RDBMS), an object database, an XML database, CMDB, a management information base (MIB), one or more flat files, other suitable non-transient storage mechanisms, or a combination thereof. By way of non-limiting example, the system 100, in some implementations, can include an XML database and a CMDB. While limited examples are described, a database implemented using the database node 118 can be configured as or comprise any suitable database type. Further, the system 100 can include one, two, three, or any suitable number of databases configured as or comprising any suitable database type or combination thereof.

In some implementations, a database implemented using the database node 118 can be configured as or comprise a CMDB. A CMDB can comprise a plurality of CIs, attributes associated with the CIs, or relationships between the CIs. A CI can be a CMDB record that represents an infrastructure entity, device, or units of the system 100. For example, the customer 102, the client 104, the network 106, the datacenter 108, the load balancer 110, the application server 112, the application node 114, the database server 116, the database node 118, or any other element, portion of an element, or combination of elements of the electronic computing and communications system 100 can be represented in the CMDB by a CI.

The CMDB can include information describing the configuration, the role, or both the configuration and the role, of an element of the system 100. In some implementations, an MIB can include one or more databases listing characteristics of the elements of the system 100. In some implementations, an object identifier (OID) can represent object identifiers of objects or elements in the MIB.

One or more databases (e.g., implemented using the database node 118), tables, other suitable information sources, or portions or combinations thereof may be stored, managed, or otherwise provided by one or more of the elements of the system 100 other than the database server 116, such as the client 104 or the application server 112.

In some implementations, a customer instance, which may also be referred to as an instance of platform software, can be implemented using one or more application nodes 114 and one or more database nodes 118. For example, the one or more application nodes 114 can implement a version of the platform software, and databases implemented by the one or more database nodes 118 can store data used by the version of the platform software. The customer instance associated with the customer 102 may be different from a customer instance associated with another customer. For example, the one or more application nodes and databases used to implement the platform software and associated data of a first customer may be different from the one or more application nodes and databases used to implement the platform software and associated data of a second customer. In some implementations, multiple customer instances can use one database node 118, such as wherein the database node 118 includes separate catalogs or other structure for separating the data used by platform software of a first customer and platform software of a second customer.

Some or all of the systems and techniques described herein can operate or be executed on or by the servers associated with the system 100. For example, the application node 114 and the database node 118 can implement an instance of platform software usable to configure a deployment plan that causes the execution of deployment agents for deploying resources to devices in a computing infrastructure. In some implementations, the systems and techniques described herein, portions thereof, or combinations thereof can be implemented on a single device, such as a single server, or a combination of devices, for example, a combination of the client 104, the application server 112, and the database server 116.

In some implementations, the system 100 can include devices other than the client 104, the load balancer 110, the application server 112, and the database server 116 as generally illustrated in FIG. 1. In some implementations, one or more additional servers can operate as an electronic computing and communications system infrastructure control, from which servers, clients, or both servers and clients, can be monitored, controlled, configured, or a combination thereof.

The network 106, one or more datacenters, such as the datacenter 108, and one or more load balancers, such as the load balancer 110, may be implemented within a distributed computing system. A load balancer associated with a distributed computing system (e.g., the load balancer 110) can communicate with the network 106, one or more datacenters (e.g., the datacenter 108), other load balancers, or a combination thereof. The load balancer 110 can be configured to route communications to a primary datacenter, identify a failover condition (e.g., an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as implemented by the database node 118, and the secondary datacenter can include a secondary database. The secondary database can include an exact or substantially exact mirror, copy, or replication of the primary database. The primary database or the secondary database can be implemented as an RDBMS, an object database, an XML database, one or more flat files, or the like.

An application node implemented within a distributed computing environment can connect to or communicate with the primary database, which can be associated with the datacenter with which the application node is associated, or associated with another datacenter. For example, a primary datacenter can include a primary database and a first set of application nodes. A secondary datacenter can include a secondary database and a second set of application nodes. The application nodes of the first and second sets can provide a software service to remote clients, and can read or write data in the primary database. The secondary database can mirror changes made to the primary database and prevent write operations from being performed directly on the secondary database. In the event that a failover condition associated with the primary database is identified, the secondary database can operate as the primary database and can allow read or write access to data. The primary database can then operate as the secondary database, mirror the new primary database, and prevent direct write access to the new secondary database.

A distributed computing system can allocate resources of a computer network using a multi-tenant or single-tenant architecture, for example. Allocating resources in a multi-tenant architecture can include installations or instantiations of one or more servers, such as application servers, database servers, or any other server, or combination of servers, which can be shared amongst multiple customers. For example, a web server, such as a unitary Apache installation; an application server, such as a unitary Java Virtual Machine (JVM); or a single database server catalog, such as a unitary MySQL catalog, can handle requests from multiple customers. In some implementations of a multi-tenant architecture, the application server, the database server, or both can distinguish between and segregate data or other information of the various customers using the system.

In a single-tenant infrastructure (which can also be referred to as a multi-instance architecture), separate web servers, application servers, database servers, or combinations thereof can be provisioned for at least some customers or customer sub-units. Customers or customer sub-units can access one or more dedicated web servers, have transactions processed using one or more dedicated application servers, or have data stored in one or more dedicated database servers, catalogs, or both. Physical hardware servers can be shared such that multiple installations or instantiations of web servers, application servers, database servers, or combinations thereof can be installed on the same physical server. An installation can be allocated a portion of the physical server resources, such as random access memory (RAM), storage, communications bandwidth, or processor cycles.

A customer instance can include multiple web server instances, multiple application server instances, multiple database server instances, or a combination thereof. The server instances can be physically located on different physical servers and can share resources of the different physical servers with other server instances associated with other customer instances. In a distributed computing system, multiple customer instances can be used concurrently. Other configurations or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, or a combination thereof.

Figure 2:
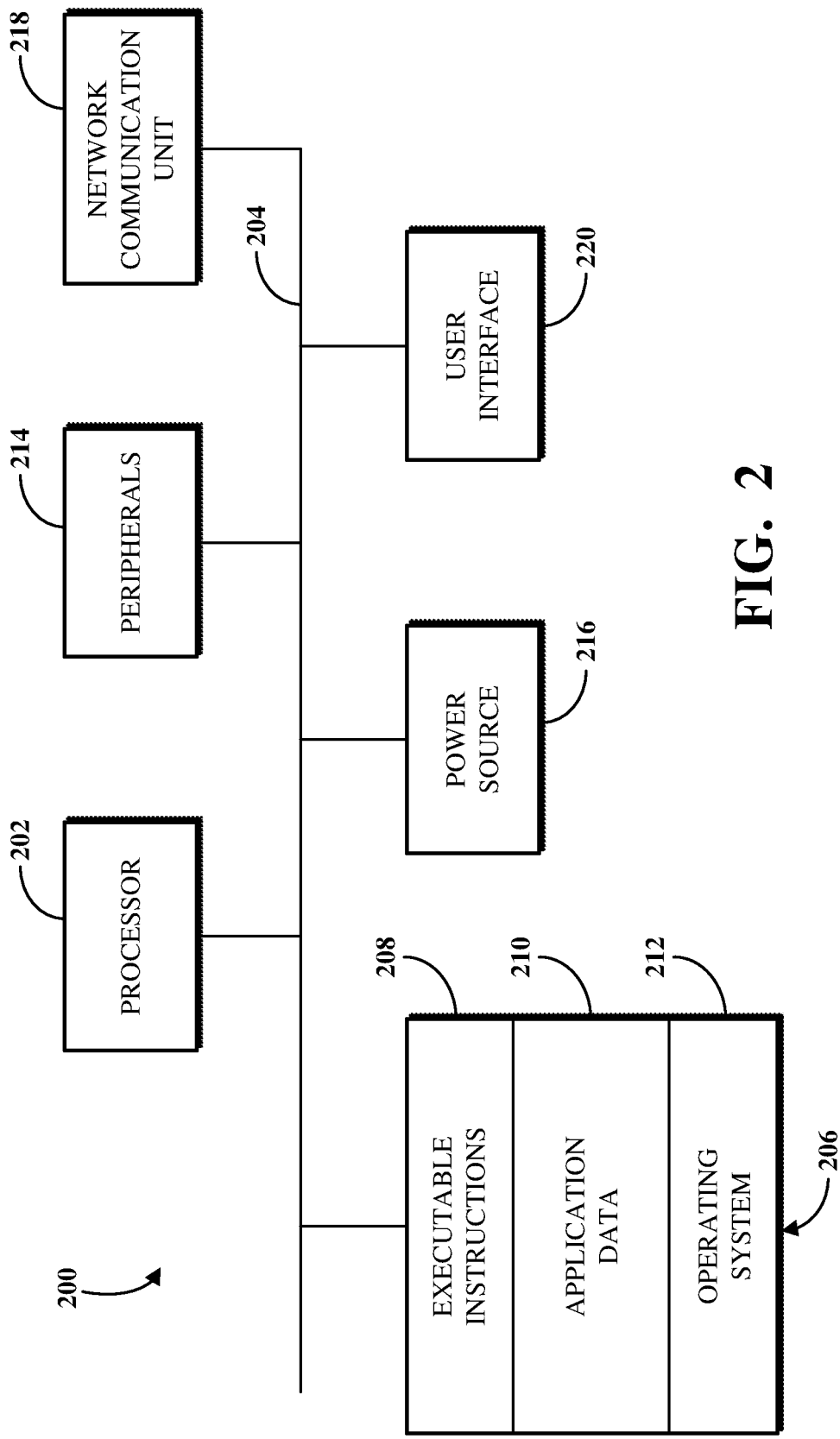
FIG. 2 is a block diagram of an example internal configuration of a computing device of an electronic computing and communications system.

FIG. 2 is a block diagram of an example of an internal configuration of a computing device 200 of an electronic computing and communications system, such as a client 104 or a server, such as an application server 112 or a database server 116, of the system 100 shown in FIG. 1. As previously described, a client or server can be a computing system including multiple computing devices or a single computing device, such as a mobile phone, a tablet computer, a laptop computer, a notebook computer, a desktop computer, a server computer, or other suitable computing devices.

A computing device 200 can include components or units, such as a processor 202, a bus 204, a memory 206, peripherals 214, a power source 216, a network communication unit 218, a user interface 220, other suitable components, or a combination thereof.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple clients or servers, such as network-based memory or memory in multiple clients or servers performing the operations of clients or servers.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions to execute a first deployment agent to perform a first deployment action, change a deployment state of the first deployment agent responsive to the performance of the first deployment action, and execute a second deployment agent to perform a second deployment action responsive to a change in a deployment state of an arbitrary deployment agent not explicitly identified within the second deployment agent.

The application data 210 can include, for example, user files, database catalogs or dictionaries, configuration information or functional programs, such as a web browser, a web server, a database server, or a combination thereof. The operating system 212 can be, for example, Microsoft Windows®, Mac OS X®, or Linux®; an operating system for a small device, such as a smartphone or tablet device; or an operating system for a large device, such as a mainframe computer. The memory 206 can comprise one or more devices and can utilize one or more types of storage, such as solid state or magnetic storage.

The peripherals 214 can be coupled to the processor 202 via the bus 204. The peripherals can be sensors or detectors, or devices containing any number of sensors or detectors, which can monitor the computing device 200 itself or the environment around the computing device 200. For example, a computing device 200 can contain a geospatial location identification unit, such as a global positioning system (GPS) location unit. As another example, a computing device 200 can contain a temperature sensor for measuring temperatures of components of the computing device 200, such as the processor 202. Other sensors or detectors can be used with the computing device 200, as can be contemplated. In some implementations, the power source 216 can be a battery, and the computing device 200 can operate independently of an external power distribution system. Any of the components of the computing device 200, such as the peripherals 214 or the power source 216, can communicate with the processor 202 via the bus 204. In some implementations, a client or server can omit the peripherals 214.

The network communication unit 218 can also be coupled to the processor 202 via the bus 204. In some implementations, the network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display (e.g., an OLED display), or other suitable display.

Certain operational aspects of the disclosure will now be described with reference to FIGS. 3 through 5. Generally, FIGS. 3 through 5 describe features and implementations related to the deployment of resources connected by a computer network within a computing infrastructure. The deployment may be performed using servers executing software for managing a computer network, such as a cloud computing instance (e.g., an instance of software implemented via application nodes and database nodes, such as the application node 114 and the database node 118 of FIG. 1.

The features and implementations associated with deployment of network resources can be included, in whole or in part, as part of one or more graphical display regions for outputting data to display for a user. In an implementation, a graphical display region can comprise part of a software graphical user interface constituting data that reflect information ultimately destined for display on a hardware device. For example, the data can contain rendering instructions for bounded graphical display regions, such as windows, or pixel information representative of controls, such as buttons and drop-down menus. The rendering instructions can, for example, be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

Figure 3:
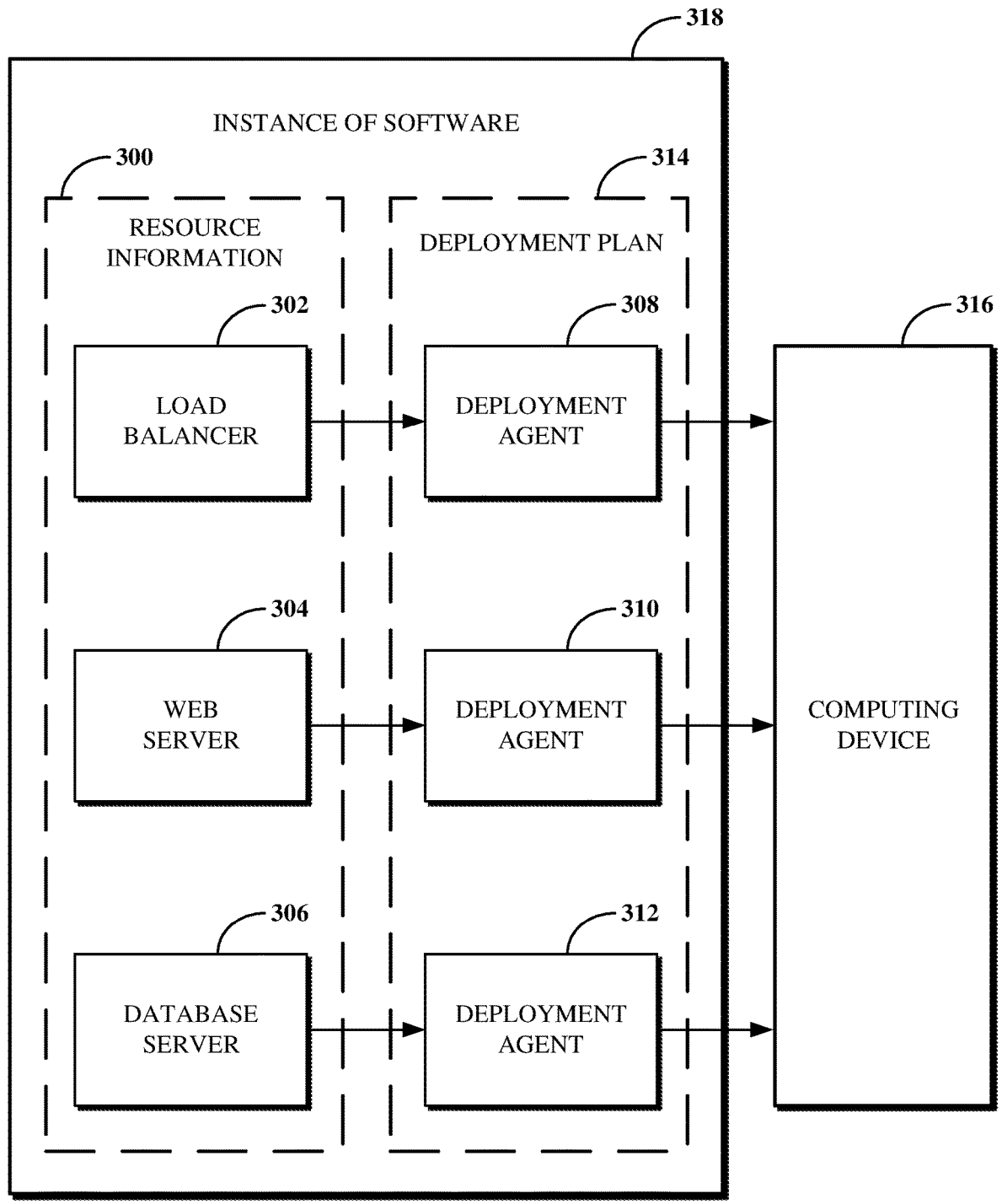
FIG. 3 is a block diagram of an example of a system for deploying resources to devices connected by a computer network within a computing infrastructure.

FIG. 3 is a block diagram of an example of a system for deploying resources 300 to devices connected by a computer network within a computing infrastructure. Resource information 300 about the resources of a computer network, such as, for example, a load balancer 302 (e.g., a Nginx load balancer), a web server 304 (e.g., a Tomcat web server), and a database server 306 (e.g., a MySQL catalog) can be provisioned for use and deployed to devices for implementing the resources within the network. For example, the resources can be provisioned based on attributes associated with records of the resources maintained by the computer network (e.g., within CIs of a CMDB). The resource information 300 may thus include attributes of CIs that represent the resources within a CMDB. Deploying the resources to devices can include executing instructions by a processor for implementing the resources on the devices. The resources shown in the figure are examples, and any type, configuration, and combination of resources can be used with the computer network as necessary or desirable to operate the computer network.

The system can include one or more deployment agents 308, 310, 312. The deployment agents 308, 310, 312 can comprise instructions executable by a processor (e.g., of a server computer on which a cloud computing instance is implemented) to deploy resources of a computer network to a device connected by the computer network. The instructions can be based on deployment configurations selected for individual deployment actions, as discussed below with respect to FIG. 4. The deployment agents 308, 310, 312 can comprise distinct instructions for deploying the respective resources associated therewith. The deployment agents 308, 310, 312 can be implemented as a software mechanism (e.g., a configuration, script, or the like) by which common software instructions can deploy all of the respective resources on the basis of the software mechanism. A deployment agent 308, 310, 312 may correspond to a single resource within the computer network. Alternatively, a deployment agent 308, 310, 312 can be used to deploy multiple resources within the computer network. A collection of deployment agents 308, 310, 312 can be included within a deployment plan 314, for example, for deploying resources usable by a customer service environment for delivering a particular service, for example, an email service, a web application, a virtual machine instance, or the like. The deployment plan 314 can include instructions executable by a processor for causing deployment agents 308, 310, 312 to execute in deploying the resources of the service. Deployment plans are discussed below with respect to FIG. 5.

The state of a loosely coupled deployment agent can be leveraged to restrict or cause the performance of a deployment action by a subject deployment agent. The deployment actions of a given deployment agent can be individually configured so that they are performed in response to a change in a state of a loosely coupled deployment agent. For example, the quality of being loosely coupled can refer to a dependency on one or more deployment agents included in a deployment plan, which can be parent deployment agents, child deployment agents, deployment agents not having a hierarchical relation to the subject deployment agent, or the subject deployment agent, itself. For example, a first deployment agent is loosely coupled to a second deployment agent where the second deployment agent does not have information usable for identifying the specific deployment agent.

As such, and as will be described below, the deployment plan 314 can be configured to cause the execution of the deployment agents 308, 310, 312, such as to perform deployment actions for using the resource information 300 to deploy resources to a computing device 316. The computing device 316 may, for example, be the computing device 200 shown in FIG. 2. For example, the computing device 316 may be the client 104 shown in FIG. 1 or another computing device within a computer network of the customer 102 shown in FIG. 1. The execution of the deployment agents 308, 310, 312 based on the deployment plan 314 to deploy resources to the computing device 316 can be performed by an instance of software 318 (e.g., the instance of software implemented using application nodes and database nodes, such as described above). For example, the instance of software 318 can be an instance of platform software implemented by a Platform-as-a-Service computing provider, such as using servers at the datacenter 108 shown in FIG. 1.

The deployment agents 308, 310, 312 can be configured to perform deployment actions upon an event, such as a change in state of an arbitrary deployment agent. The deployment plan 314 can include a sequence of deployment actions performed by ones of the deployment agents 308, 310, 312, such as to cause one or more resources to be deployed to the computing device 316 for delivering a service, for example, an email service, a web application, or the like. Deployment agents can deploy corresponding resources to devices connected by a computer network. For example, the deployment agents 308, 310, 312 can respectively deploy the load balancer 302, the web server 304, and the database server 306 to a computing device 316.

In some implementations, however, the deployment may be facilitated without using the deployment agents 308, 310, 312. For example, pre-existing software installed on or credentials indicated to the computing device 316 to which a resource will be deployed can be used to facilitate deployment. Although FIG. 3 shows a single computing device 316 to which the resources 302, 304, 306 are deployed, other implementations are possible. For example, to the extent permitted based on the computing infrastructure, each of resources 302, 304, 306 could be deployed to distinct computing devices, or one could be deployed to a first computing device and the other two to a second computing device.

Figure 4:
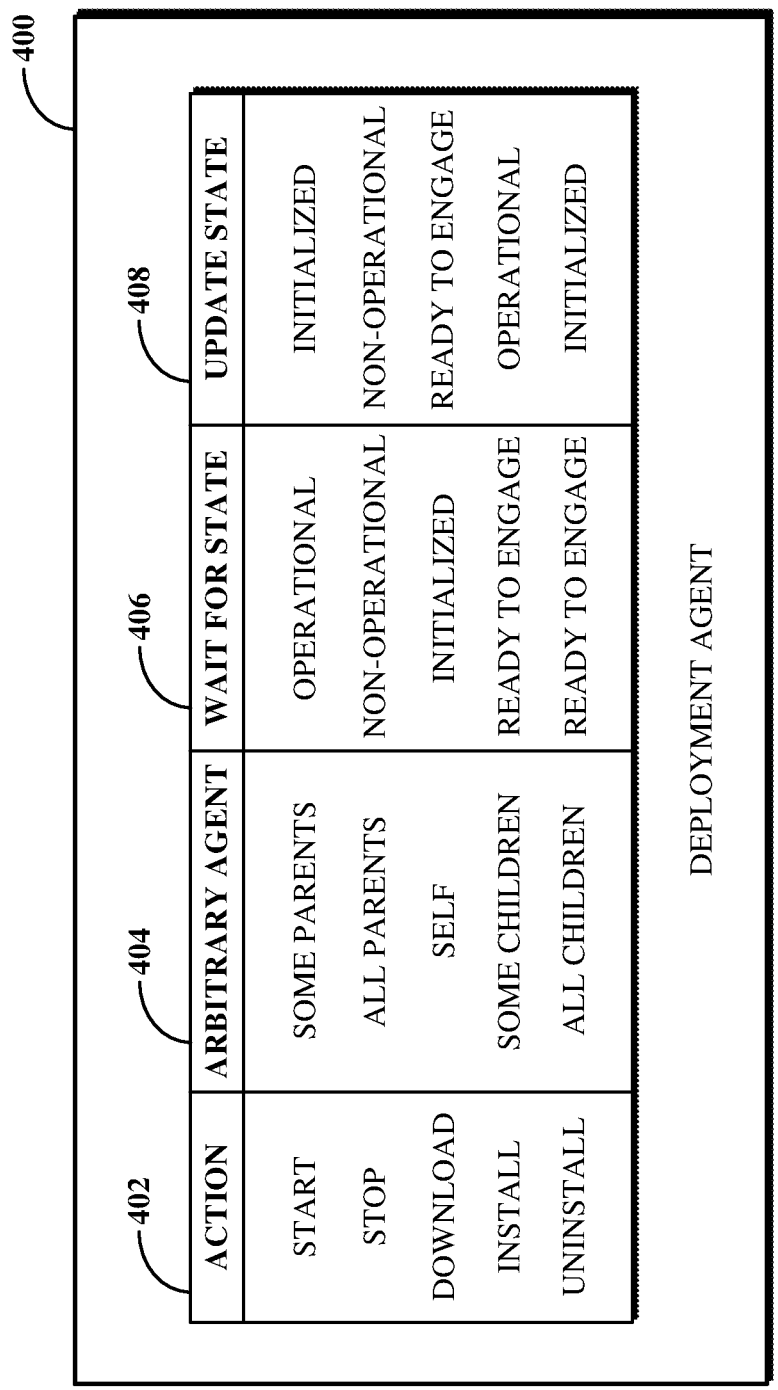
FIG. 4 is an illustration of an example of a deployment agent.

FIG. 4 is an illustration of an example of a deployment agent 400. The deployment agent 400 can include or otherwise have associated with it data usable for performing deployment actions based on loose couplings with other deployment agents as part of a deployment plan. The deployment agent 400 can include data indicating deployment actions 402 performable by the deployment agent 400, loosely coupled arbitrary deployment agents 404, wait for states 406 of the arbitrary deployment agents, and update states 406 for the deployment agent 400. The data included in or otherwise associated with the deployment agent 400 (e.g., indicating the deployment actions 402, the arbitrary deployment agents 404, the wait for states 406, and/or the update states 408) can constitute a deployment configuration for deploying a corresponding resource to a device of a computer network.

The deployment actions 402 can indicate an operation to be performed by the deployment agent 400 in deploying a corresponding resource to a device. For example, the deployment actions 402 can include start, stop, download, install, uninstall, configure, substitute, or the like. The deployment actions 402 that can be performed by the deployment agent 400 can be based on the resource corresponding to the deployment agent 400. For example, the deployment actions included in a deployment agent used for deploying a Tomcat may be different from those included in a deployment agent used for deploying a MySQL instance. Certain deployment actions 402 can be included in or otherwise associated with the deployment agent 400 by default (e.g., based on the corresponding resource). The deployment actions 402 included in or otherwise associated with the deployment agent 400 may be configurable, for example, by a system administrator of the computer network connecting the device to which the corresponding resource is deployed. Each deployment action 402 can represent a step involved in deploying a resource corresponding to the deployment agent 400 to a device usable within a computer network, for example, to prepare a cloud computing instance.

The arbitrary deployment agents 404 can be associated with the deployment actions 402. The performance of a given deployment action 402 can be based on an arbitrary deployment agent 404, which can be loosely coupled to the deployment agent 400 in that no specific deployment agent is explicitly identified. Rather, information indicating a relationship between the deployment agent 400 and arbitrary deployment agent can be included. For example, an arbitrary deployment agent 404 can reference one, some, or all parent and/or children deployment agents of the deployment agent 400. In another example, an arbitrary deployment agent 404 can reference deployment agents not hierarchically connected to the deployment agent 400 within a deployment plan. In yet another example, an arbitrary deployment agent 404 can reference the deployment agent 400, itself.

The wait for state 406 can indicate a state of a corresponding arbitrary deployment agent 404 for triggering the performance of a corresponding deployment action 402. For example, a corresponding deployment action 402 can be performed upon a state of the corresponding arbitrary deployment agent 404 changing to the indicated wait for state 406. For example, a start deployment action can be performed by the deployment agent 400 when some parents of the deployment agent 400 are in an operational state. The states in which a deployment agent can be can include, for example, initialized, ready to engage, operational, non-operational, error, or the like. As with the deployment actions 402, the wait for states 406 available for a deployment agent 400 can be included based on the resource corresponding to the deployment agent and/or configurable, for example, by a system administrator of a corresponding computer network. Where an arbitrary deployment agent 404 references some parent and/or children deployment agents, a threshold value can be used to indicate a number of parent and/or children deployment agents to have a wait for state 406 in order for a deployment action 402 to be performed. For example, the threshold value can indicate that 60 percent of deployment agent 400's children are to be operational before the deployment agent 400 begins performing the start deployment action. Where the children of the deployment agent 400 happen to be a cluster of five Tomcats, performance of the deployment action can begin upon three of the five Tomcats being in an operational state.

The update state 408 can indicate a state to which to change the state of the deployment agent 400 upon completing a corresponding deployment action 402. For example, the performance of a deployment action 402 can be used to indicate a change in state for use by other deployment agents to which the deployment agent 400 is loosely coupled (which may, in some implementations, include the deployment agent 400, itself). For example, a deployment agent for a Tomcat may not perform a download step until the state of all of its parent deployment agents is operational, and its state may change to operational once the download step has been performed. A deployment agent for a MySQL catalog that happens to include the Tomcat deployment agent as a parent in the deployment plan may be configured so that it does not perform a download step until after all of its parent deployment agents is also operational. The change in state of the Tomcat deployment agent can thus cause the download step of the MySQL catalog deployment agent to be performed.

While the figure shows the deployment agent 400 as including data for the deployment actions 402, the arbitrary deployment agents 404, the wait for states of the arbitrary deployment agents 406, and the update states 408, other data not shown or herein disclosed may also be included within or otherwise associated with a deployment agent. Similarly, it may be the case that a deployment agent usable by the implementations of the present disclosure does not include one or more of the foregoing data items shown, or that it includes data items not shown and excludes certain data items that are shown. For example, data indicating the update state 408 can be maintained within a data store external to a deployment agent, wherein the deployment plan includes a reference to the data store upon the completion of a corresponding deployment action 402.

Figure 5:
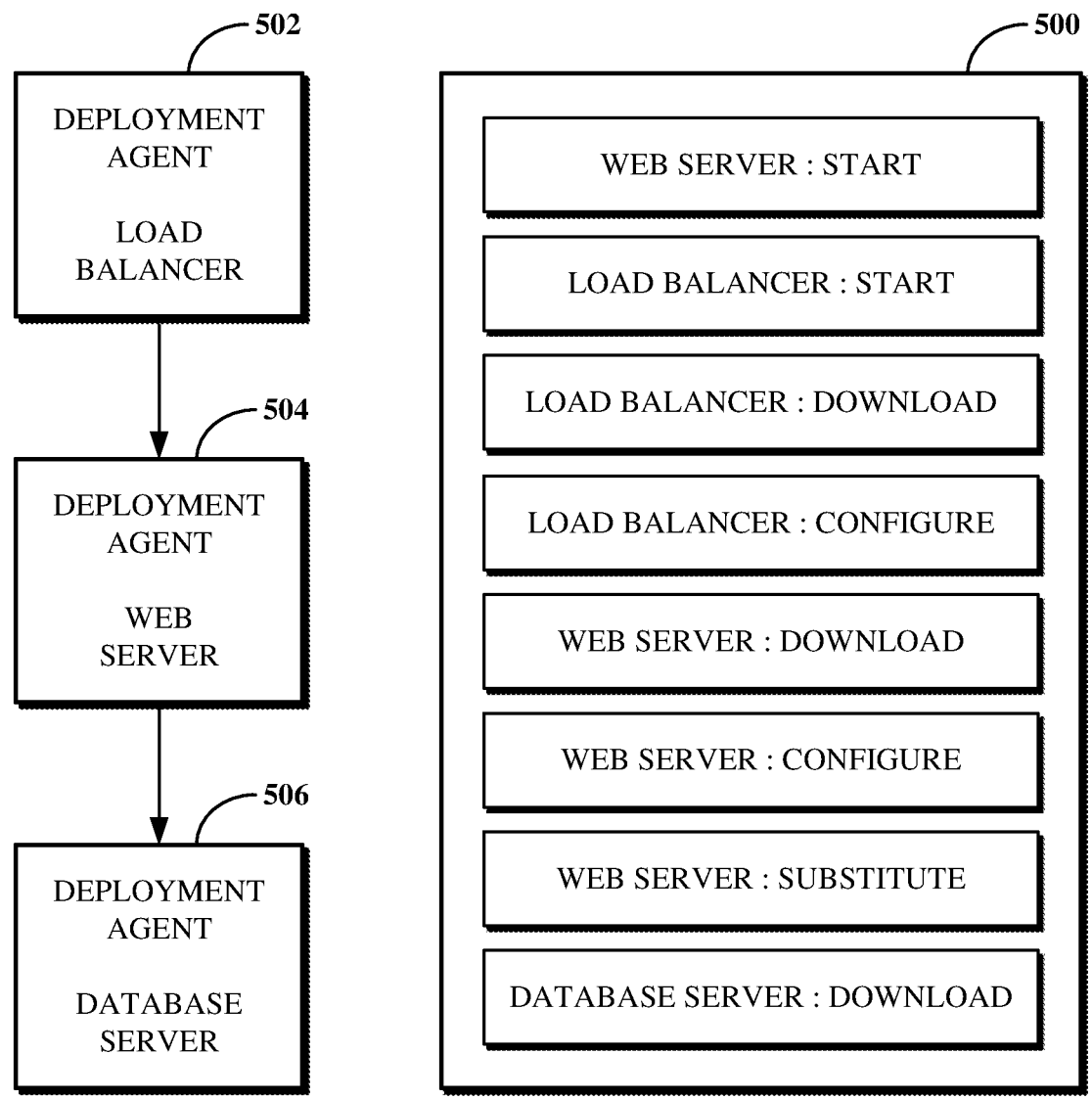
FIG. 5 is a block diagram of an example of a deployment plan usable within a computing infrastructure.

FIG. 5 is a block diagram of an example of a deployment plan 500 usable within a computing infrastructure. The deployment plan 500 can include or otherwise use deployment agents (e.g., the deployment agent 400 shown in FIG. 4) related as part of a customer service environment. For example, the deployment plan 500 can include deployment agents 502, 504, 506 for a load balancer, a web server 504, and a database server, respectively, which can deploy their respective resources to deliver a web application to clients of a customer environment implemented within the computing infrastructure. As shown in the figure, the load balancer deployment agent 502 is a parent of the web server deployment agent 504, and the database server deployment agent 506 is a child of the web server deployment agent 504. The deployment agents 502, 504, 506 included in the deployment plan 500 can be configured, for example, by a system administrator of a computer network. For example, other deployment agents corresponding to resources of the network can be added to, removed from, or moved within the deployment plan 500. In another example, configuration of the deployment plan 500 can be done using a graphical display region.

The deployment plan 500 can be configured to cause the execution of one or more deployment agents 502, 504, 506 it includes, for example, in causing the deployment agents 502, 504, 506 to perform deployment actions for deploying resources to devices within a computing infrastructure. Configuring the deployment plan 500 to cause the execution of the deployment agents 502, 504, 506 can include indicating relationships between deployment agents involved in delivering a corresponding customer service environment and executing instructions to select a first deployment agent to perform a deployment action in deploying the resources for delivering the service. The execution of a deployment agent and/or instructions for selecting or otherwise processing deployment agents or deployment actions can be done by a processor, for example, of a server computer implementing the deployment plan 500. For example, the deployment plan 500 can include instructions executable by the processor for directing a deployment agent 502, 504 506 to perform a deployment action. The deployment plan 500 can be configured on a server, such as a server device on which an instance of a cloud computing environment including the customer service environment is implemented.

The deployment plan 500 can include plan steps for listing the sequence of deployment actions performed by the deployment agents included in deployment plan 500 (e.g., the deployment agents 502, 504, 506). For example, the deployment agent 502 can be configured such that it does not perform a start deployment action until after all child deployment actions are in an initialized state. The deployment agent 504 can be instructed to perform a start deployment action in order to change its state to reflect that it has been initialized. The deployment agent 502 can then perform its start deployment action, and others which may be based on changes in the state of the deployment agent 502, itself (e.g., download, configure). The completion of the configure deployment action by the deployment agent 502 can result in the load balancer (e.g., Nginx) being operational in order to direct web traffic to the web server (e.g., Tomcat) deployable by the deployment agent 504. Other deployment actions may then be performed by the deployment agents 502, 504, 506, as applicable, in order to deploy the web server and database server (e.g., MySQL catalog) to devices to enable the web application service delivered by those resources.

The plan steps can be a log of the sequence of deployment actions already performed through the deployment plan 500, which can record a given deployment action immediately upon its performance or wait until the entire sequence has been performed before so recording. For example, the plan steps can be used to indicate a sequence of deployment actions to be performed by the deployment agents 502, 504, 506 included in the deployment plan 500.

Figure 6:
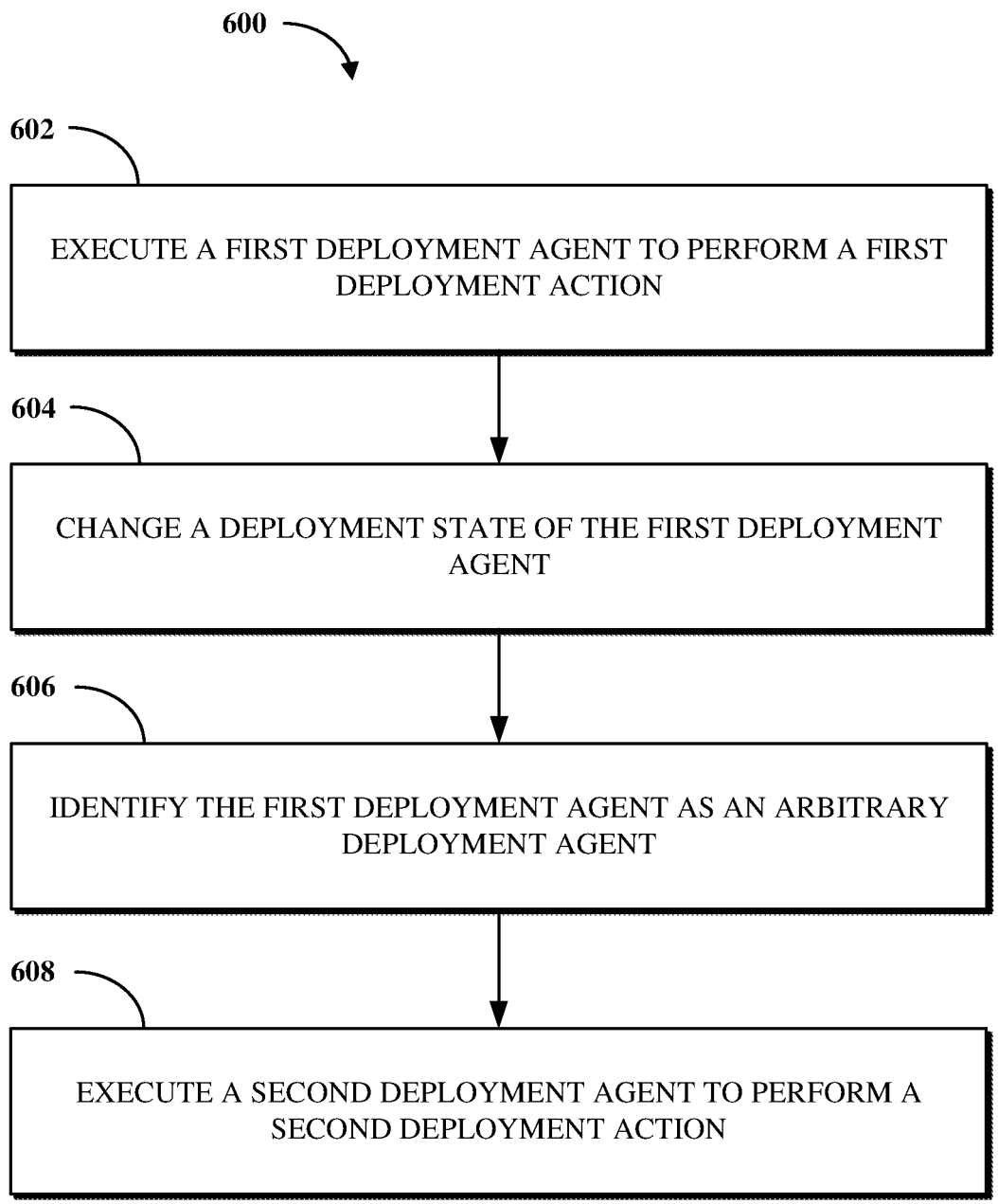
FIG. 6 is a flowchart illustrating a first example of a technique for deploying resources to devices connected by a computer network within a computing infrastructure using loosely coupled deployment agents.

Further implementations of the disclosure will now be described with reference to FIG. 6. FIG. 6 is a flowchart illustrating a first example of a technique 600 for deploying resources to devices connected by a computer network within a computing infrastructure using loosely coupled deployment agents. The technique 600 can be executed using computing devices, such as the systems, modules, and devices described with respect to FIGS. 1 through 5. The technique 600 can be performed, for example, by executing a machine-readable program or other computer-executable instructions, such as instructions or programs described according to JavaScript, C, or other such instructions. The steps, or operations, of the technique 600 or any other technique, method, process, or algorithm described in connection with the implementations disclosed herein can be implemented directly in hardware, firmware, software executed by hardware, circuitry, or a combination thereof.

Although the technique 600 is shown as a series of operations for clarity, implementations of the technique 600 or any other method, technique, process, and/or algorithm described in connection with the implementations disclosed herein can be performed in various orders and/or concurrently. Additionally, operations in accordance with this disclosure can be performed with other operations not presented and described herein. Furthermore, one or more aspects of the systems and techniques described herein can be omitted.

In an implementation, the technique 600 includes executing a first deployment agent to perform a first deployment action via 602, changing a deployment state of the first deployment agent via 604, identifying the first deployment agent as an arbitrary deployment agent via 606, and executing a second deployment agent to perform a second deployment action via 608.

The technique 600 begins at operation 602, where a first deployment action can be performed by a first deployment agent. Performing the first deployment action by the first deployment agent can comprise executing, by a processor, the first deployment agent to cause an execution of instructions for performing the first deployment action. The first deployment agent can be configured to perform the first deployment action based on a deployment state associated with the first deployment action. In some implementations, executing the first deployment agent for performing the first deployment action can include deploying a first resource corresponding to the first deployment agent to a first device of a computing infrastructure.

In response to the performance of the first deployment action at operation 602, at operation 604, a state of the first deployment agent can be changed. The state to which the first deployment agent is changed in response to performing the first deployment action can be configured, for example, for use by other deployment agents in performing certain of their deployment actions. That is, and as discussed above, the performance of a deployment action by a deployment agent can be based on a state of a loosely coupled deployment agent. For example, operation 602 can be implemented by a Tomcat deployment agent performing a substitute operation, which, when performed, changes the state of the Tomcat deployment agent to operational. A child deployment agent of the Tomcat deployment agent, such as a MySQL catalog deployment agent, may be configured so that it performs a download deployment action up one of its parent deployment agents being in an operational state. Accordingly, the changing of the state of the Tomcat deployment agent can cause the MySQL catalog deployment agent to be able to perform one of its deployment actions.

At operation 606, the first deployment agent can be identified as an arbitrary deployment agent associated with a second deployment agent in a deployment plan including the first and second deployment agents. For example, the technique 700 can be performed in connection with a deployment plan configured to cause the execution of deployment agents, which may be related for the purpose of delivering a customer service environment or otherwise deploying associated resources to devices in a computer network. For example, the deployment plan can be configured to cause the execution of the first deployment agent and a second deployment agent associated with an arbitrary deployment agent. The deployment plan can indicate a relationship between the first and second deployment agents, for example, a loose coupling between them. For example, the deployment plan can include an identification of the first deployment agent as the arbitrary deployment agent for which the change in state is associated with the performance of a second deployment action by a second deployment agent (e.g., at operation 608, discussed below). The deployment plan may include information identifying the various deployment agents involved in delivering the related service or otherwise deploying the related devices. However, in order to facilitate loose coupling between deployment agents, identity information for deployment agents may not be shared with deployment agents. In this way, loose coupling of deployment agents can include using an external system for processing instructions based on other deployment agents.

The deployment plan can be configured according to a dependency relationship between the arbitrary deployment agent and the second deployment agent, such as where the identification of the first deployment agent as the arbitrary deployment agent reflects a dependency relationship between the first deployment agent and the second deployment agent. For example, identifying the first deployment agent as the arbitrary deployment agent associated with the second deployment can include identifying the first deployment agent as a parent or child deployment agent selected for a second deployment action to be performed by the second deployment agent. For example, identifying the first deployment agent as the arbitrary deployment agent associated with the second deployment can include indicating the first deployment agent to the second deployment agent, for example, in response to the second deployment agent querying the deployment plan for an arbitrary deployment agent. Other implementations beyond those discussed herein can be used for identifying the first deployment agent as the arbitrary deployment agent associated with the second deployment, for example, by generating or calculating data, determining or selecting the first deployment agent from a list of deployment agents (e.g., within the deployment plan), or the like.

At operation 608, a second deployment action can be performed by the second deployment agent. Performing the second deployment action by the second agent can comprise executing, by a processor (which may be the same processor or a different processor than that used for executing the instructions for performing the first deployment action), the second deployment agent to cause an execution of instructions for performing the second deployment action. The second deployment agent can be configured to perform the second deployment action based on a change in a state of an arbitrary deployment agent. For example, and in response to identifying the first deployment agent as the arbitrary deployment agent based on the deployment plan, the second deployment agent can perform the second deployment action in response to the change in state of the first deployment agent. Performing the second deployment action can include deploying a second resource corresponding to the second deployment agent to a second device of a computing infrastructure. The second device to which the second deployment agent deploys the associated resource can be the same device as, or a different device than, the first device to which the first deployment agent deploys its associated first resource.

In some implementations, executing the second deployment agent to perform the second deployment action can include determining that the deployment state of the arbitrary deployment agent has changed to a specified value defined in a configuration of the second deployment agent. For example, the second deployment agent can be configured to perform the second deployment action when the deployment state of the arbitrary deployment agent is changed to "initialized," "operational," "non-operational," or another specified state. For example, the second deployment agent may not execute if the deployment state to which the arbitrary deployment agent changes is not the specified value defined in the configuration of the second deployment agent. In some implementations, executing the second deployment agent to perform the second deployment action can include determining that deployment states of a threshold number of arbitrary deployment agents have changed. For example, the second deployment agent can be configured to perform the second deployment action upon changes in deployment states of multiple arbitrary deployment agents. For example, the configuration of the second deployment agent can include a threshold number of the multiple arbitrary deployment agents. The second deployment agent can perform the second deployment action responsive to a determination that the number of arbitrary deployment agents having changed deployment states meets the threshold number. In some implementations, the technique 700 can include changing the deployment state of the second deployment agent responsive to performing the second deployment action.

An implementation includes means for executing, based on a deployment plan, a first deployment agent to perform a first deployment action, wherein the first deployment agent is configured to deploy a first resource to a first device of the computing infrastructure; means for changing a deployment state of the first deployment agent responsive to performing the first deployment action; and means for executing, based on the deployment plan, a second deployment agent to perform a second deployment action responsive to a change in a deployment state of an arbitrary deployment agent not explicitly identified within the second deployment agent, wherein the second deployment agent is configured to deploy a second resource to a second device of the computing infrastructure, wherein the deployment plan includes an identification of the first deployment agent as the arbitrary deployment agent.

An implementation includes means for performing a first deployment action using a first deployment agent configured to deploy a first resource to a first device; means for changing a deployment state of the first deployment agent responsive to performing the first deployment action; and means for performing a second deployment action using a second deployment agent responsive to a change in a deployment state of an arbitrary deployment agent not explicitly identified within a second deployment agent, wherein the second deployment agent is configured to deploy a second resource to a second device, wherein the first deployment agent is identified as the arbitrary deployment agent.

All or a portion of the implementations of the systems and techniques described herein can be implemented using a general-purpose computer/processor with a computer program that, when executed, carries out any of the respective techniques, algorithms, or instructions described herein. In addition, or alternatively, for example, a special-purpose computer/processor can be utilized, which can include specialized hardware for carrying out any of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination.

For example, one or more computing devices can include an ASIC or programmable logic array (e.g., a field-programmable gate array (FPGA)) configured as a special-purpose processor to perform one or more of the operations described or claimed herein. An example FPGA can include a collection of logic blocks and RAM blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by any number of hardware or software components that perform the specified functions. For example, the described implementations can employ various integrated circuit components (e.g., memory elements, processing elements, logic elements, look-up tables, and the like), which can carry out a variety of functions under the control of one or more microprocessors or other control devices. Similarly, where the elements of the described implementations are implemented using software programming or software elements, the systems and techniques can be implemented with any programming or scripting language, such as C, C++, Java, assembler, or the like, with the various algorithms being implemented with a combination of data structures, objects, processes, routines, or other programming elements. Functional aspects can be implemented in algorithms that execute on one or more processors. Furthermore, the implementations of the systems and techniques could employ any number of conventional techniques for electronics configuration, signal processing or control, data processing, and the like. The words "mechanism" and "element" are used broadly and are not limited to mechanical or physical implementations, but can include software routines in conjunction with processors, etc.

Likewise, the terms "module" or "monitor" as used herein and in the figures may be understood as corresponding to a functional unit implemented using software, hardware (e.g., an ASIC), or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, the use of the word "example" is intended to present concepts in a concrete fashion. The use of any and all examples, or language suggesting that an example is being described (e.g., "such as"), provided herein is intended merely to better illuminate the systems and techniques and does not pose a limitation on the scope of the systems and techniques unless otherwise claimed. As used in this disclosure, the term "or" is intended to mean an inclusive "or" rather than an exclusive "or." That is, unless specified otherwise or clearly indicated otherwise by the context, the statement "X includes A or B" is intended to mean any of the natural inclusive permutations thereof. For example, if X includes A; X includes B; or X includes both A and B, then "X includes A or B" is satisfied under any of the foregoing instances. In addition, the articles "a" and "an" as used in this disclosure and the appended claims should generally be construed to mean "one or more," unless specified otherwise or clearly indicated by the context to be directed to a singular form. Moreover, use of the term "an implementation" or the term "one implementation" throughout this disclosure is not intended to mean the same implementation unless described as such.

The particular implementations shown and described herein are illustrative examples of the systems and techniques and are not intended to otherwise limit the scope of the systems and techniques in any way. For the sake of brevity, conventional electronics, control systems, software development, and other functional aspects of the systems (and components of the individual operating components of the systems) cannot be described in detail. Furthermore, the connecting lines, or connectors, shown in the various figures presented are intended to represent example functional relationships or physical or logical couplings between the various elements. Many alternative or additional functional relationships, physical connections, or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is intended merely to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if each respective reference were individually and specifically indicated as being incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system for deploying resources within a computing infrastructure, the system comprising:
    at least one memory storing a deployment plan and instructions for a plurality of deployment agents, wherein the deployment plan defines dependency relationships between the plurality of deployment agents; and
    at least one processor configured to execute the instructions of a first deployment agent of the plurality of deployment agents to perform actions comprising:
        determining that the first deployment agent has a first dependency, wherein the first dependency only defines a relationship type, a wait-for-state value, and a threshold value;
        querying the deployment plan to determine a set of deployment agents of the plurality of deployment agents having a dependency relationship with the first deployment agent that corresponds to the relationship type;
        determining respective deployment states of the set of deployment agents; and
        in response to determining that a sufficient portion of the respective deployment states have the wait-for-state value to satisfy the threshold value of the first dependency, performing a first deployment action with respect to deploying a resource to a device of the computing infrastructure.

2. The system of claim 1, wherein the relationship type indicates a partial parent relationship type and each of the set of deployment agents is determined to have a parent dependency relationship with the first deployment agent in the deployment plan.

3. The system of claim 1, wherein the relationship type indicates a partial child relationship type and each of the set of deployment agents is determined to have a child dependency relationship with the first deployment agent in the deployment plan.

4. The system of claim 1, wherein the at least one processor is configured to execute instructions of a second deployment agent of the plurality of deployment agents to perform actions comprising:
    determining that the second deployment agent defines a second dependency, wherein the second dependency only defines a second relationship type and a second wait-for-state value;
    querying the deployment plan to determine that the second deployment agent has a second dependency relationship with the first deployment agent that corresponds to the second relationship type;
    determining a deployment state of the first deployment agent;
    when the deployment state of the first deployment agent has the second wait-for-state value to satisfy the second dependency, performing a second deployment action with respect to deploying a second resource to the device of the computing infrastructure; and
    updating a deployment state of the second deployment agent in response to performing the second deployment action.

5. The system of claim 4, wherein the second relationship type indicates a parent relationship type and the second dependency relationship between the first deployment agent and the second deployment agent is a parent-child relationship in the deployment plan.

6. The system of claim 4, wherein the second relationship type is child relationship type and the second dependency relationship between the first deployment agent and the second deployment agent is a child-parent relationship in the deployment plan.

7. The system of claim 4, wherein the first deployment agent and the second deployment agent are the same deployment agent, and wherein the second relationship type is a self relationship type.

8. The system of claim 1, wherein the deployment action comprises: downloading the resource to the device, installing the resource on the device, uninstalling the resource from the device, starting the resource on the device, or stopping the resource on the device.

9. The system of claim 1, wherein the first dependency is a loosely coupled dependency.

10. The system of claim 1, wherein the threshold value is less than 100%.

11. The system of claim 1, wherein each of the respective deployment states of the set of deployment agents comprises: initialized, non-operational, ready to engage, operational, or initialized.

12. The system of claim 1, wherein the wait-for-state value comprises:
    initialized, non-operational, ready to engage, operational, or initialized.

13. A method for deploying resources within a computing infrastructure using a plurality of deployment agents, comprising:
    determining, via a first deployment agent of the plurality of deployment agents, that the first deployment agent has a first dependency, wherein the first dependency only defines a relationship type, a wait-for-state value, and a threshold value;
    querying, via the first deployment agent, a deployment plan to determine a set of deployment agents of the plurality of deployment agents having a dependency relationship with the first deployment agent that corresponds to the relationship type;

determining, via the first deployment agent, respective deployment states of the set of deployment agents;

in response to determining, via the first deployment agent, that a sufficient portion of the respective deployment states have the wait-for-state value to satisfy the threshold value of the first dependency, performing, via the first deployment agent, a first deployment action with respect to deploying a first resource to a first device of the computing infrastructure; and updating, via the first deployment agent, a deployment state of the first deployment agent in response to performing the first deployment action.

14. The method of claim 13, comprising:

determining, via a second deployment agent of the plurality of deployment agents, that the second deployment agent defines a second dependency, wherein the second dependency only defines a second relationship type and a second wait-for-state value;

querying, via the second deployment agent, the deployment plan to determine that the second deployment agent has a second dependency relationship with the first deployment agent that corresponds to the second relationship type;

determining, via the second deployment agent, the deployment state of the first deployment agent; and in response to determining that the deployment state of the first deployment agent corresponds to the second wait-for-state value to satisfy the second dependency, performing, via the second deployment agent, a second deployment action with respect to deploying a second resource to a second device of the computing infrastructure; and updating, via the second deployment agent, a deployment state of the second deployment agent in response to performing the second deployment action.

15. The method of claim 14, wherein the first resource is a load balancer and the second resource is a web server.

16. The method of claim 14, wherein the first resource is a web server and the second resource is a database server.

17. A non-transitory, computer-readable storage medium comprising a deployment plan and instructions executable by at least one processor of a computing infrastructure, wherein the deployment plan defines dependency relationships between a plurality of deployment agents of the computing infrastructure, the instructions comprising instructions for a first deployment agent of the plurality of deployment agents to:

determine that the first deployment agent has a first dependency, wherein the first dependency only defines a relationship type, a wait-for-state value, and a threshold value;

query the deployment plan to determine at least one deployment agent of the plurality of deployment agents having a dependency relationship with the first deployment agent that corresponds to the relationship type;

determine respective deployment states of the at least one deployment agent; and in response to determining that a sufficient portion of the respective deployment states have the wait-for-state value to satisfy the threshold value of the first dependency:

perform a first deployment action with respect to deploying a resource to a device of the computing infrastructure; and update a deployment state of the first deployment agent in response to performing the first deployment action.

18. The medium of claim 17, wherein the instructions comprise instructions for a second deployment agent of the plurality of deployment agents to:

determine that the second deployment agent of the plurality of deployment agents defines a second dependency, wherein the second dependency only defines a second relationship type and a second wait-for-state value;

query the deployment plan to determine that the second deployment agent has a second dependency relationship with the first deployment agent that corresponds to the second relationship type; and in response to determining that the deployment state of the first deployment agent has the second wait-for-state value to satisfy the second dependency:

perform a second deployment action with respect to deploying a second resource to a second device of the computing infrastructure; and update a deployment state of the second deployment agent in response to performing the second deployment action.

19. The medium of claim 18, wherein the instructions comprise instructions for a third deployment agent of the plurality of deployment agents to:

determine that the third deployment agent of the plurality of deployment agents defines a third dependency wherein the third dependency only defines a third relationship type and a third wait-for-state value;

query the deployment plan to determine that the first deployment agent and the second deployment agent have a third dependency relationship with the third deployment agent that corresponds to the third relationship type; and in response to determining that the deployment state of the first deployment agent and the deployment state of the second deployment agent have the third wait-for-state value to satisfy the third dependency:

perform a third deployment action with respect to deploying a third resource to a third device of the computing infrastructure; and update a deployment state of the third deployment agent in response to performing the third deployment action.

20. The medium of claim 19, wherein the resource is a load balancer, the second resource is a web server, and the third resource is a database server.

* * * * *